Patented Feb. 13, 1923.

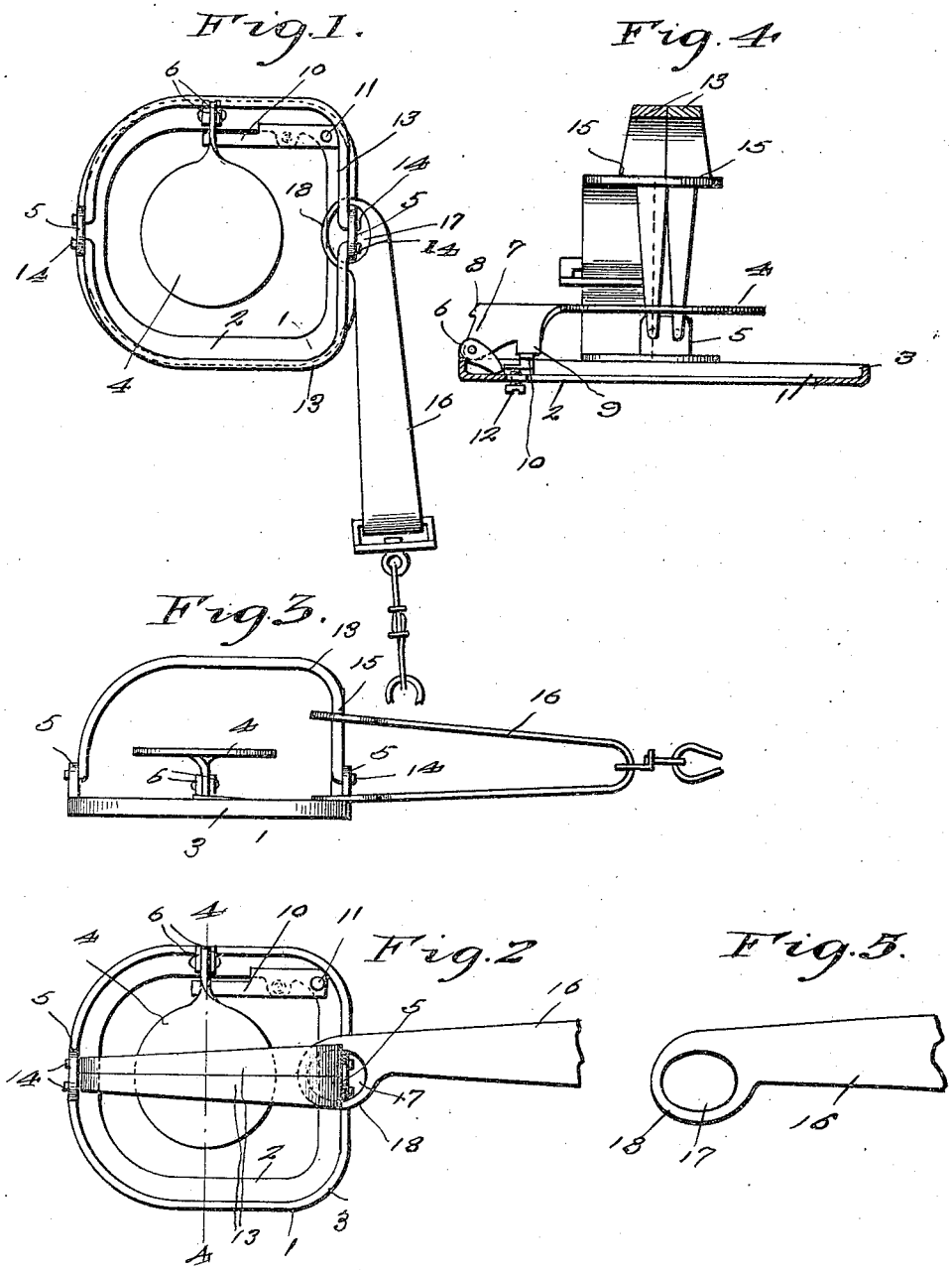
Feb. 13, 1923.
W. DEWEY.
ANIMAL TRAP.
FILED JUNE 21, 1922.
1,445,203.

1,445,203

UNITED STATES PATENT OFFICE.

WILLIAM DEWEY, OF BIRCHWOOD, WISCONSIN.

ANIMAL TRAP.

Application filed June 21, 1922. Serial No. 570,000.

*To all whom it may concern:*

Be it known that I, WILLIAM DEWEY, a citizen of the United States, residing at Birchwood, in the county of Washburn and State of Wisconsin, have invented new and useful Improvements in Animal Traps, of which the following is a specification.

One object of my said invention is the provision in an animal trap of a flanged base which affords ample room under the pan to prevent clogging by snow or dirt, and one that is stiff and strong, is calculated to afford increased room under the pan to allow the foot of an anmal to extend to a point within the jaws, and is possessed of the capacity to straighten when the animal pulls on the jaws and in that way bring about tightening of the jaws and thereby assure a tight grip on the caught animal.

To the attainment of the foregoing, the invention consists in the improvement as hereinafter described and definitely claimed.

In the accompanying drawings, forming part of this specification:—

Figure 1 is a plan view of my novel trap as it appears when set.

Figure 2 is a similar view of the sprung trap.

Figure 3 is a side elevation of the sprung trap.

Figure 4 is a transverse section taken in the plane indicated by the line 4—4 of Figure 2.

Figure 5 is an enlarged detail view of the inner portion of the upper arm of the jaw spring showing the advantageous oval opening in said arm near the free end thereof.

Similar numerals of reference designate corresponding parts in all of the views of the drawings.

One of the chief features of my novel trap resides in the open base 1 having a bottom portion 2 and an upstanding marginal flange 3. The said flanged base is manifestly stiff and strong when made of sheet metal, and it is also advantageous because it affords considerable room under the pan 4 and hence allows the foot of an animal to reach deep into the trap. The broad bottom 2 also lessens the liability of the base sinking into the ground which would be objectionable because it would interfere with the operation of the pan. On the flange 3 at opposite points are apertured lugs 5, and also on the said flange 3 and arranged midway between and at right angles to the lugs 5 is a pair of standards 6, the lugs and standards being integral with the flange 3. Pivoted between the standard 6 is a vertically disposed arm 7 of the pan, the said arm 7 having at its outer end and remote from the pivot a keeper projection 8. On its inner edge the said arm 7 is provided with a projection 9, designed to bear against a spring strip 10, connected at 11 by a rivet or other means to the bottom 2 of the base 1. The said spring strip 10 is adapted to be engaged by the depending projection 9 on the pan arm 7. Bearing in the bottom 2 of the base and against the underside of an intermediate portion of the spring strip 10 is a screw 12. The said screw 12 constitutes an important feature of my invention inasmuch as it is adapted to be adjusted so as to prevent small animals such as rabbits and birds from springing the trap when the trap is set for large animals. The jaws 13 of the trap terminate in trunnions 14 which are journaled in the lugs 5. On adjacent upright portions of the jaws 13 are shoulders 15.

The jaw spring of the trap is of the usual loop type. The said spring is, however, peculiar in that its upper arm 16 is provided near its end with an oval opening 17 which receives the said shouldered uprights of the jaws 13. It will also be noticed that the oval opening 17 is formed in an end offset 18 of the spring arm. In virtue of this construction when the jaw spring is set at right angles to the length of the jaws it is adapted to spring upwardly to a high point on the jaws where the shoulders 15 are located so that when the animal pulls and the jaw spring straightens out or moves to a position in alinement or substantial alinement with the jaws, the comparatively narrow portion of the oval opening 17 will be in engagement with the upright portions of the jaws so that the jaws will tightly grip and securely hold the leg of the animal, and the harder the animal pulls the tighter the grip will be.

It will also be manifest from the foregoing that the trap is very easy and convenient, it being simply necessary to press the upper arm of the jaw spring and the jaw downwardly until one of the jaws is caught below the keeper projection 8 of the pan arm.

In addition to the practical advantages of my novel trap set forth in the foregoing, it will be noted that the trap may be made light in weight and yet very strong, and that it is simple in construction and is free of delicate parts such as are likely to get out of order after a short period of use.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letter Patent, is:—

1. In an animal trap, the combination of a base, jaws pivotally connected to the base, a jaw spring, a pan having an arm pivotally connected to the base and a projection on said arm to engage and detachably hold one jaw, a spring strip carried by the base and arranged to exert upward pressure against the pan arm, and a regulating screw bearing in the base and against the underside of said spring strip at an intermediate point in the length of the latter.

2. In an animal trap, the combination of a base, jaws pivotally connected to the base, a jaw spring, a pan having an arm pivotally connected to the base and a projection on said arm to engage and detachably hold one jaw, a spring strip carried by the base and arranged to exert upward pressure against the pan arm, and a regulating screw bearing in the base and against the underside of said spring strip at an intermediate point in the length of the latter; the said pan arm being provided with a depending projection to bear against the said spring strip.

3. The combination in an animal trap, of a base, swinging jaws pivoted to the base, and a jaw spring of loop type, said jaw spring having an upper arm and said upper arm having an end offset in which is an oval opening receiving adjacent uprights of the jaws and relatively arranged when the loop spring is moved from a position at right angles to the length of the jaws to a position in substantial alinement with the jaws to bind and hold the jaws together.

In testimony whereof I affix my signature.

WILLIAM DEWEY.